United States Patent

[11] 3,613,666

| | | |
|---|---|---|
| [72] | Inventor | Milo Hobbs |
| | | Torrance, Calif. |
| [21] | Appl. No. | 848,798 |
| [22] | Filed | Aug. 11, 1969 |
| [45] | Patented | Oct. 19, 1971 |
| [73] | Assignee | North American Rockwell Corporation |

[54] SYSTEM FOR DETECTING GLAUCOMA
6 Claims, 1 Drawing Fig.

[52] U.S. Cl. .................................................. 128/2, 73/80
[51] Int. Cl. .................................................. A61b 3/16, A61b 3/00
[50] Field of Search .................................................. 128/2, 2.05, 24.1; 73/71.3, 80; 351/6, 16

[56] References Cited
UNITED STATES PATENTS

| | | | |
|---|---|---|---|
| 3,070,087 | 12/1962 | Sittel ............................ | 128/2 R |
| 3,192,765 | 7/1965 | Keiper ........................... | 128/2 R X |
| 3,355,934 | 12/1967 | Foster ........................... | 73/71.3 |
| 3,449,945 | 6/1969 | Mohrman ....................... | 73/80 |

*Primary Examiner*—Richard A. Gaudet
*Assistant Examiner*—J. C. McGowan
*Attorneys*—L. Lee Humphries, H. Frederick Hamann and Robert G. Rogers ABSTRACT: A light beam is directed at an eye being tested. The light is reflected to a detector. The eye is vibrated simultaneously by a vibrator placed adjacent to an eyelid. The response of the eye to the vibration as measured by the detector is calibrated to indicate pressure.

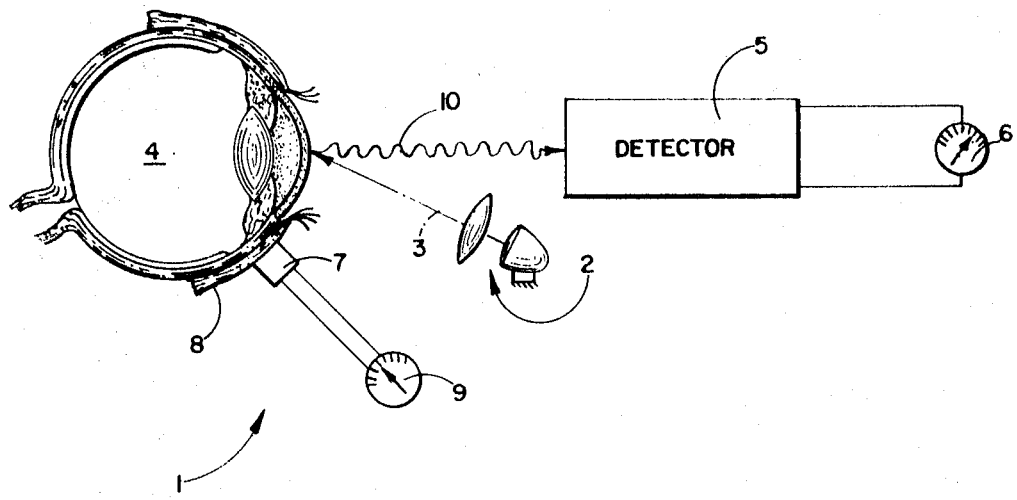

SYSTEM FOR DETECTING GLAUCOMA

BACKGROUND OF THE INVENTION

1. Field of the Invention

This invention relates to a system for detecting glaucoma and more particularly to a system remote from the eye in which the response of an eye to vibrations is used to indicate the pressure within the eye.

2. Description of Prior Art

The intraocular pressure of persons suffering from chronic glaucoma continuously increases until optic atrophy and loss of vision results. Normal intraocular pressure of about 10-25 mm. Hg. is measured with a tonometer. Abnormal intraocular pressure would be pressures in excess of 25 mm. Hg.

Several different tonometers are available for measuring intraocular pressure by mechanically displacing the cornea. Certain of the devices are purely mechanical while others are a combination of a mechanical detector and electronic amplifier with a readout device. The mechanical devices ordinarily require that the eye be anesthetized and that the patient be lying down when the tonometer is placed on the eye. The electronic devices are sufficiently sensitive so that the eye does not have to be anesthetized and the patient can be in a sitting position. However, the electronic devices require a trained doctor or technician to touch the corneal surface of the eye with a transducer. Some patients become extremely apprehensive and make the measurement more difficult. In addition, the transducers used in the electronic devices must be sterilized after each use to prevent spread of disease.

An intraocular pressure measuring device is preferred which does not require an anesthetic or contact between a transducer and the surface of the eye. It would be preferred if the system could be used by technicians after a short training period to test for glaucoma using the device in a few seconds.

SUMMARY OF THE INVENTION

Briefly, the invention comprises means for directing a focused light beam onto the eye and means for detecting light reflected from the eye. Means are positioned against the eyelid, which is remote from the eye, for vibrating the eye. The amount of reflected light is changed in response to the vibration of the eye and as a function of the pressure within the eye. The change is detected for indicating the pressure within the eye.

In one embodiment, the frequency of the vibrator is changed until a resonant frequency has been passed. At resonance, a relatively large change in the reflected light is detected. The frequency of the vibrator is calibrated to read out millimeters of pressure at resonance.

In another embodiment, the vibrator is set at a fixed frequency within a range which spans the resonant frequencies for most eyes. The light which is reflected from the eye is modulated by the vibrations as a function of the eye pressure. The modulation is detected and used to indicate eye pressure.

Therefore, it is an object of this invention to provide a remote intraocular pressure-measuring system.

It is another object of this invention to provide a system for detecting glaucoma which does not require that the eye be anesthetized.

A still further object of the invention is to provide a system for remotely measuring intraocular pressure without the necessity for touching the eye with a transducer and without requiring the use of a trained doctor or technician.

A further object of the invention is to provide a process for measuring the intraocular pressure of an eye by detecting the change of reflected light as the eye is vibrated.

A further object of the invention is to provide a system for measuring intraocular pressure by vibrating the eye and checking the effects of the vibration on the light reflected from the eye.

These and other objects of the invention will become more apparent when taken in connection with the following description of the drawings, a brief description of which follows:

BRIEF DESCRIPTION OF DRAWINGS

The FIGURE is a schematic diagram of one embodiment of the remote intraocular detection system.

DESCRIPTION OF THE PREFERRED EMBODIMENT

The FIGURE is a schematic illustration of one embodiment of system 1 for detecting the intraocular pressure of an eye. The system comprises light source 2 which is focused to direct a lightbeam 3 onto the corneal surface of an eye 4. The light on the corneal surface is reflected onto detector 5. Meter 6 at the output of the detector provides an indication of the amount of light reflected for a given set of conditions. The detector may be comprised of a photocell circuit arrangement which can be used to detect changes in reflected light. In certain embodiments, it may be desirable to place a wedge-shaped slit over the detector surface to obtain an accurate indication of the change in the reflected light for a given set of conditions. It is believed that the photocell detectors of the type which can be used herein are well known in the art. For instance, such a detector is shown by Wallmark, J. T., proceedings of the IRE, Volume 45, pages 474-483, Apr. 1957. T. T. Kumagai, U.S. Pat. No. 3,498,717 (filed Jan. 1966) shows a matrix of photoelectric cells geometrically arranged and with appropriate output logic to register the position of light pulses.

The FIGURE further illustrates variable vibrator 7 placed adjacent to eyelid 8. So long as the surface of the vibrator does not contact the eye, it need not be sterilized after each use. It is important that the transducer be placed adjacent to the eyelid, however, to overcome the losses which would be encountered by vibrations travelling across an open space. Ultrasonic vibrators of the type which can be used to vibrate the eye are commercially available so that additional details should not be required. Generally, the vibrator must be capable of vibrating the eye at frequencies around 25-30 kilocycles.

Meter 9 is connected at the output of vibrator 7 to give an indication of the pressure of the eye as a function of the frequency of vibration. However, in certain embodiments the meter could be used to give an indication of the frequency.

In one embodiment of the invention, the light source 2 is activated for focusing a beam of light 3 onto the cornea of the eye 4. The reflected light is detected, and an indication of the magnitude is given by meter 6. The vibrator 7 is actuated for vibrating eye 4. In the preferred embodiment, a range of frequencies is traversed until meter 6 indicates a relatively large change in the reflected light. When the relatively large change in reflected light is detected, it is known that the resonant frequency of the eye has been reached. Meter 9 is calibrated to read intraocular pressure in millimeters of mercury. Therefore, at resonance, the eye pressure can be read directly from meter 9 to determine whether or not the patient being tested has glaucoma. Pressures above 25 millimeters of mercury indicate glaucoma.

In other embodiments, vibrator 7 is set at a fixed frequency within the range of resonant frequencies normally encountered. In that embodiment, meter 9 is calibrated to indicate frequency and not pressure. Meter 6 is calibrated to read eye pressure as a function of the modulation of light 3 by the vibrations of vibrator 7. In other words, reflected light 10 oscillates across the surface of the detector 5 as a function of the degree of modulation caused by vibrations of eye 4. At certain pressures, the modulation increases while at other pressures the modulation decreases. Therefore, it should be obvious that the amplitude of the modulation is a function of the pressure within the eye so that it can be used to test for glaucoma.

I claim:

1. A system for detecting the intraocular pressure to assist in diagnosing glaucoma, said system comprising, means for focusing a light beam onto the corneal surface of an eye, means for detecting changes in light reflected from the surface, means for being placed adjacent to an eyelid of the eye for vibrating the eye for affecting said reflected light, means associated with either said detecting means or said vibrating means calibrated as a function of eye pressure for determining the intraocular pressure of the eye under diagnosis.

2. The combination as recited in claim 1 wherein said vibrator has a variable frequency means, for changing the frequency of said vibration until the resonance of the eye is detected, said detector means including means to indicate when said resonance occurs, said calibrated means being associated with said vibrating means for indicating the pressure within said eye at resonance.

3. The combination as recited in claim 1 wherein said vibrator means vibrates at a fixed frequency and said light detector means includes means for detecting the modulation of said light due to said vibrations, said calibrated means being associated with said detecting means for indicating the pressure within the eye as a function of said light modulation.

4. A process for measuring the intraocular pressure within an eye as an aid in diagnosing glaucoma, said process comprising the steps of:

directing a focused light beam onto the corneal surface of an eye, detecting light reflected from said corneal surface, vibrating said eye for changing the amount of reflected light, reading the intraocular pressure as a function of said change in reflected light to determine pressure within the eye under diagnosis.

5. The process as recited in claim 4 wherein the frequency of the vibration is changed until a relatively large change in the amount of reflected light is detected indicating resonance of the eye, the frequency of said vibration being calibrated to read pressure of the eye so that at resonance, the intraocular pressure is read as a function of the resonant frequency.

6. The process as recited in claim 4 wherein the frequency of said vibrations is fixed and the modulation of said reflected light is detected and calibrated to read pressure of the eye.